United States Patent [19]

Foulkes et al.

[11] 4,330,687
[45] May 18, 1982

[54] AUDIO AND FULL DUPLEX DIGITAL DATA CARRIER SYSTEM

[75] Inventors: John D. Foulkes, Kirkland; David K. Worthington, Bellevue, both of Wash.; John E. Trombly, Winchester, Mass.

[73] Assignee: Teltone Corporation, Kirkland, Wash.

[21] Appl. No.: 20,252

[22] Filed: Mar. 14, 1979

[51] Int. Cl.³ ............... H04M 11/06; H04H 1/08
[52] U.S. Cl. .................. 179/2 DP; 179/170 R; 375/9; 307/227
[58] Field of Search ......... 179/2 DP, 2.5 R, 15 AN, 179/15 FD, 15 FE, 16 F, 170 R; 178/71 R, 58 R, 66 R; 325/5, 30; 328/14; 307/227; 375/8, 9; 332/9R

[56] References Cited

U.S. PATENT DOCUMENTS

| | | |
|---|---|---|
| 2,006,470 | 7/1935 | Mathes ........................... 179/1 R |
| 2,352,918 | 7/1944 | Smith ............................. 179/4 |
| 3,103,556 | 9/1963 | Nichols et al. ................. 179/15 FE |
| 3,832,637 | 8/1974 | Alexander et al. ............. 179/2 DP |
| 4,242,542 | 12/1980 | Kimbrough ..................... 179/170 R |

FOREIGN PATENT DOCUMENTS

| | | |
|---|---|---|
| 641853 | 4/1964 | Belgium . |
| 878674 | 6/1953 | Fed. Rep. of Germany . |
| 1131747 | 6/1962 | Fed. Rep. of Germany . |
| 1223872 | 9/1966 | Fed. Rep. of Germany . |
| 834664 | 2/1941 | France . |
| 2285752 | 4/1976 | France . |
| 1252325 | 11/1971 | United Kingdom ............ 179/2 DP |

OTHER PUBLICATIONS

Article "Entwurf eines Datensenders für frequenzmodulierie Signale", Radio Fernsehen Elektronik, vol. 26, No. 6, 1977, pp. 203-205, by Horst Jungnickel.
Article "An Audio Synthesizer", QST for Apr. 1972, vol. 56, No. 4, pp. 35-39, by Herbert Drake, Jr.
Transmission Systems for Communications, Bell Telephone Laboratories, 1959, pp. 5-10 and 5-11.
U. Piské and H. Willrett, "Integrated Communication System for Speech and Data", Electrical Communication, vol. 45, No. 2, 1970, pp. 116-122.
Article "Systeme A 300 Voies Sur Paires Symetriques", Cables and Transmission, vol. 26, No. 2, Apr. 1972, pp. 119-131 by C. Chalhoub and R. Migeon.

Primary Examiner—Bernard Konick
Assistant Examiner—J. A. Popek
Attorney, Agent, or Firm—Christensen, O'Connor, Johnson & Kindness

[57] ABSTRACT

A subscriber data carrier system for simultaneously carrying both base band telephone signals and full duplex digital data transmissions on a single pair of nonloaded telephone wires is disclosed. That is, the system provides for simultaneous conventional telephone signaling and audio communication and full duplex digital data communication between a pair of subscribers, each connected to the same main distribution frame of a central office by a single pair of nonloaded telephone wires. The system includes a modem (21) located at each subscriber's premises. The modems are connected to the subscriber's telephone (23) and digital data terminal (25). The modems include data transmitters (47) and receivers (49) that convert digital data from binary form into FSK form for transmission and from FSK form into binary form upon reception. More specifically, the transmitters include a frequency synthesizer (59) that produces one or the other of two FSK signals (F1 or F2) depending upon the binary nature (0 or 1) of a particular data bit to be transmitted; and, the receivers include frequency detectors (67) that detect two other FSK signals (F3 and F4) and, depending upon the frequency of the detected signal produce a corresponding binary data bit (0 or 1). F1 and F2 are produced in a manner that maintains phase coherency during shifts between F1 and F2 and in a manner such that the waveforms of F1 and F2 are substantially free of harmonics at the frequencies of F3 and F4. The modems also include voice filters (41) that prevent the FSK data signals from reaching the subscribers telephones. The system also includes a repeater (33) located at the central office that bidirectionally converts transmitted FSK signals (i.e., F1 and F2 signals) into receivable FSK signals (i.e., F3 and F4 signals). The repeater (33) also includes voice frequency filters (101,103) that connect the main distribution frame telephone lines to the central office line switching equipment in a manner that prevents the FSK signals from reaching that equipment.

48 Claims, 8 Drawing Figures

Fig. 6.
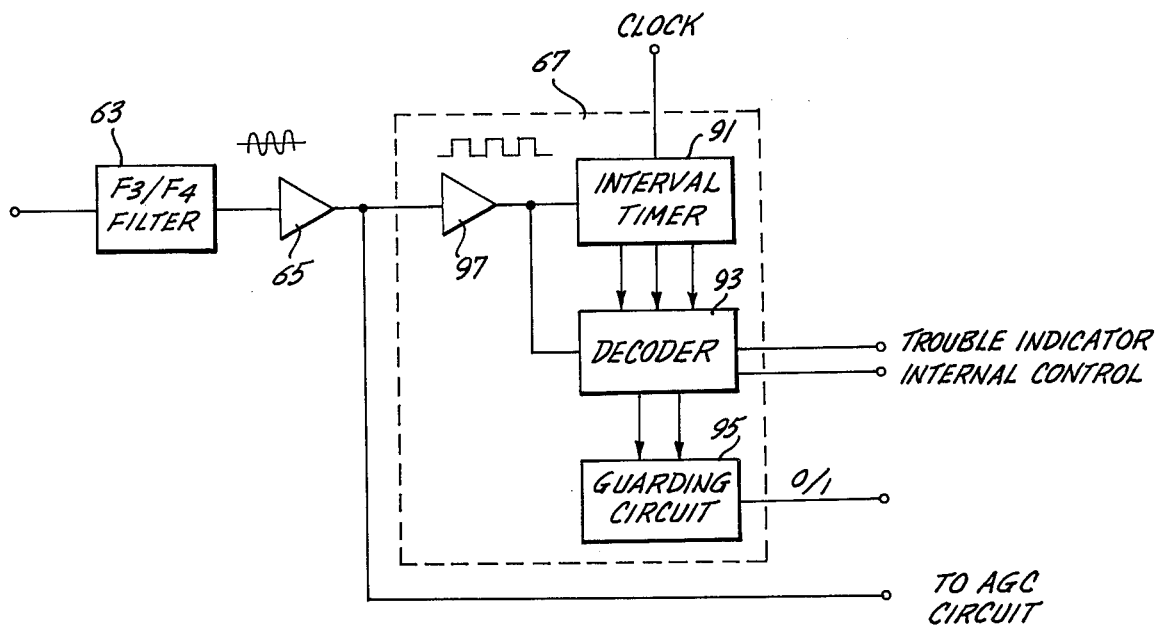
Fig. 7.

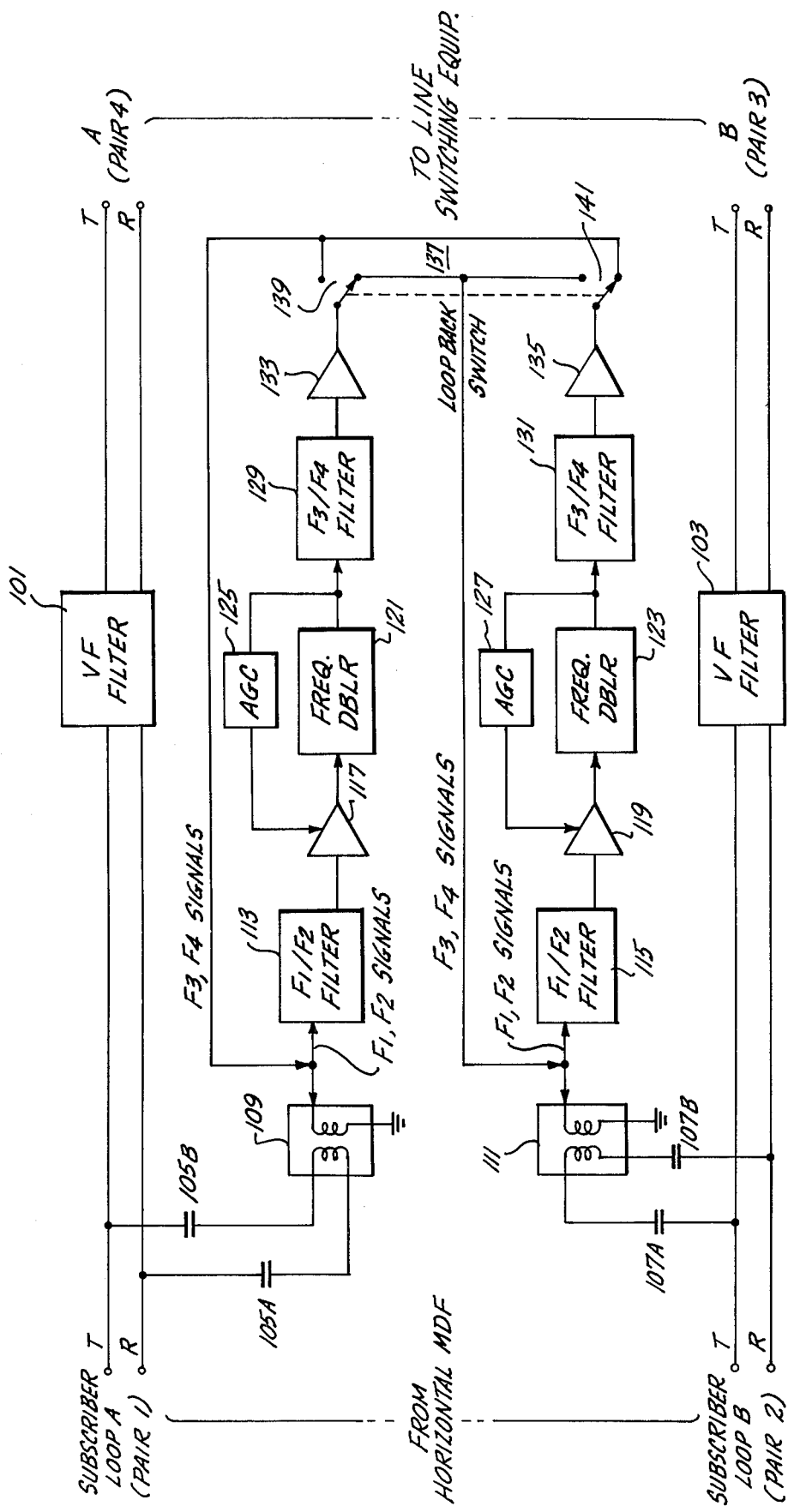

AUDIO AND FULL DUPLEX DIGITAL DATA CARRIER SYSTEM

TECHNICAL FIELD

This invention relates to communication systems and, more particularly, to wired communication systems adapted to carry both digital data signals and analog communication signals.

BACKGROUND OF THE INVENTION

At present full duplex digital data transmission between two subscribers connected to the same central office requires the use of two nonloaded wire pairs. That is, at present, when it is necessary or desirable for two subscribers to have the capability of simultaneously transmitting digital data between each other (commonly called full duplex digital data transmission capability), two pairs of nonloaded wires running between each subscriber and the central office are required. The two pairs of wires are jumpered at the main distribution frame of the central office so that one pair of wires can carry transmissions in one direction and the other pair of wires can carry transmissions in the other direction. At the subscriber's locations, the pairs of wires are connected to data terminals via modems (modulator-demodulator systems). Various data transmission techniques are utilized to transmit digital data over the two pairs of so connected wires, including relatively low Frequency Shift Keying (FSK) techniques.

One of the major disadvantages of the foregoing type of data transmission system is the need for two pairs of wires. More specifically, telephone operating companies (TELCO's) charges to subscribers are based in part on the number of pairs of wires running between the central office and each subscriber's premises. As a result, a data transmission system requiring two pairs of wires is substantially more expensive than a comparable data system requiring only a single pair of wires. It is an object of this invention to accomplish this result.

That is, it is an object of this invention to provide a digital data carrier system that provides for the simultaneous transmission of digital data signals in both directions over a single pair of wires.

In addition to the two wire pair requirement for full duplex digital data capability, at present, usually, a subscriber needs at least one additional pair of wires if conventional telephone communication is desired. That is, usually, the digital data wire pairs used to carry digital data, carry digital data only and an additional pair of wires is needed for voice communication, when simultaneous digital data and voice communication is desired. As a result, the subscribers costs are further increased. It is an also an object of this invention to overcome this disadvantage. That is, it is also an object of this invention to provide a communication system suitable for simultaneously transmitting digital data and voice signals over a single pair of wires.

It is a more specific object of this invention to provide an audio and full duplex digital data carrier system suitable for transmitting digital data between two subscribers connected to the same central office and audio communication between the subscribers and yet other subscribers all via single pairs of wires extending between the subscribers and the central office.

As will be better understood from the following description, the present invention contemplates transmitting digital data in Frequency Shift Keying (FSK) form.

As will be readily understood by those familiar with FSK digital data transmission, such transmission requires the production of a signal that shifts between two different frequencies. In order to minimize the bandwidth used by this transmission method, it is necessary that the phase of the sine waves of the transmitted signals be maintained coherent when shifting from one frequency to the other. It is a further object of this invention to provide an FSK transmitter that accomplishes this result. That is, it is a further object of this invention to provide a new and improved FSK transmitter that maintains the coherence between the phases of generated sine waves when changing from one FSK frequency to another FSK frequency.

As will also be understood by those familiar with FSK data transmission, when full duplex transmission on a single pair of wires is to take place, in addition to being at different frequencies, the waveforms of the transmitted and received signals must be such that they do not include harmonics at the other signal frequencies. Or, if such harmonics are included in the waveforms, the level of such harmonics must be so low as to be undetectable.

Therefore, it is a still further object of this invention to provide a full duplex FSK digital data transmission system wherein the transmitted and received FSK signal pairs are at different frequencies and wherein the waveforms of the various FSK signals are very low in harmonics at or near the fundamental frequencies of the other FSK signals.

It is yet another object of this invention to provide a full duplex FSK digital data transmission system wherein the waveforms of a pair of transmitted FSK signals are low in harmonics at or near the frequencies of a higher pair of received FSK signals.

It is yet a further object of this invention to provide a new and improved FSK transmitter.

It is yet a still further object of this invention to provide an FSK transmitter that produces a pair of FSK signals at different frequencies, each of said FSK signals having a generally sinusoidal waveform that is low in harmonics at other predetermined frequencies, and that maintains phase coherence between the pair of FSK signals when shifting from one signal to the other signal.

SUMMARY OF THE INVENTION

In accordance with this invention, voice and full duplex digital data transmission on a single pair of nonloaded wires is provided. Preferably, the invention is incorporated in a conventional telephone system for use by subscribers connected to a central office by nonloaded telephone wire pairs. That is, the invention uses the single pairs of nonloaded telephone wires extending between the main distribution frame of a central office and two subscribers to transmit digital data between the subscribers. Both subscribers remain connected to the main distribution frame of the same central office via the same pairs of wires, which also carry conventional voice communication signals simultaneously with the data signals.

The preferred form of the invention includes a modem located at each subscriber's premises. The modems are connected to the subscriber's data terminals and include a transmitter that produces one or the other of two FSK signals (F1 or F2), depending upon the binary nature (0 or 1) of a particular data bit to be transmitted. The modems also include receivers that detect two other FSK signals (F3 and F4) and, depending upon the frequency of the received signal, produce binary data bits (0 or 1) in accordance therewith. F1 and F2 are produced in a manner that maintains phase coherency during shifts between F1 and F2 and in a manner such that the waveforms of F1 and F2 are substantially free of harmonics at the frequencies of F3 and F4. In addition, the modems include voice frequency filters that couple the subscriber's telephones to the wire pairs running to the central office in a manner that prevents the FSK signals from reaching the telephones. Also included is a repeater located at the central office that couples the two data channels together at the main distribution frame. In addition to simply coupling the lines together, the repeater bidirectionally converts transmitted FSK signals (i.e., F1 and F2 signals) into receivable FSK signals (i.e., F3 and F4 signals) and forwards the converted signals to the receiving modem. Further, the repeater includes a voice frequency filter that couples that subscriber's lines to the line switching equipment of the central office so that voice communication either between the subscribers or between one of the subscribers and others can take place.

In accordance with further features of this invention, the modem transmitters include frequency synthesizers that create the transmitted FSK signals. The frequency synthesizers produce signals having a generally sinusoidal shape, but stair step in form. By appropriately choosing the number and sizes of the steps, the signals produced by the frequency synthesizers will be low in harmonics near the received frequencies.

In its preferred form, each frequency synthesizer includes an operational amplifier, a resistance network and a control circuit. The resistance network includes a pair of resistors of equal value connected in series between a reference voltage source and ground. The junction between the resistors is connected to one of the inputs of the operational amplifier (e.g., the noninverting input). Another resistor of the resistance network is connected between the output of the operational amplifier and the other input (e.g., the inverting input). One end of each of the remaining resistors of the resistance network is connected to the feedback resistance input (e.g., inverting) of the operational amplifier. The other ends of the remaining networks are connected to a switching system forming part of the control circuit. The switching system is also connected to the reference voltage, to ground and to the junction between the pair of voltage divider resistors such that either ground, the reference voltage or one-half of the reference voltage can be applied to the other ends of the remaining resistors. The control circuit controls the switching system in sequence such that nine (9) discrete voltage levels are produced at the output of the operational amplifier. More specifically, the control circuit controls the switching system such that sinusoidally weighted voltage level changes occur at equal intervals at the output of the operational amplifier. Since a sinusoid is symmetrical, eighteen (18) intervals, each at the appropriate one of the nine (9) voltage levels, form a complete sinusoid. Since eighteen intervals make up a complete sinusoid, the frequency of the intervals is equal to eighteen times the frequency of the signal to be transmitted (i.e., F1 or F2). Moreover, simply changing the interval frequency without changing any of the other parameters provides a smooth shift between the frequencies to be transmitted (e.g., F1 and F2). As a result, phase coherence between the two signals during a frequency change is maintained.

In accordance with further features of this invention, the receiver portion of each subscriber's modem determines the frequency of a received FSK signal in a conventional manner by counting clock pulses occurring between the zero crossing points of a complete cycle of the received signal. The results of the count are decoded and, in order to prevent erroneous operation due to extraneous signals, tested by a guarding circuit. The guarding circuit requires that at least two cycles of a particular frequency be detected before a signal is accepted as a true FSK digital data signal. In addition, the decoder produces outputs when the frequency of the received signal, even though lying outside of the band determined by a true FSK digital data signal, is such that it can provide information regarding the operation of the system.

It will be appreciated from the foregoing brief description that the invention provides a new and improved audio and full duplex digital data carrier system. The invention provides for the simultaneous transmission of digital data between two subscribers on a single pair of nonloaded telephone wires. In addition, the same wires that carry digital data can also carry simultaneous audio and D.C. communication signals. Consequently, the need for a subscriber to lease a plurality of pairs of wires to carry the same amount of audio and digital data is eliminated. As a result, the overall costs of an audio and full duplex data carrier system are reduced. In addition to providing a new and improved audio and data carrier system, the invention also provides a new and improved FSK frequency synthesizer. More specifically, the invention provides an uncomplicated frequency synthesizer adapted to produce FSK signals relatively free of harmonics which interfere with other FSK signals. Not only are the produced FSK signals relatively free of harmonics at other predetermined frequencies, the frequency synthesizer of the invention provides for a smooth, phase coherent, shift from one FSK frequency to another FSK frequency. As a result, the bandwidth occupied by the transmitted FSK signals is relatively narrow.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 6 is a block diagram of a receiver suitable for use in the modem illustrated in FIG. 3;

FIG. 7 is a timing diagram used to describe the decoding of signals by the receiver illustrated in FIG. 6; and, FIG. 8 is a block diagram of a repeater suitable for use in the audio and full duplex digital data carrier system illustrated in FIG. 1.

DESCRIPTION OF THE PREFERRED EMBODIMENT

Figure 1:
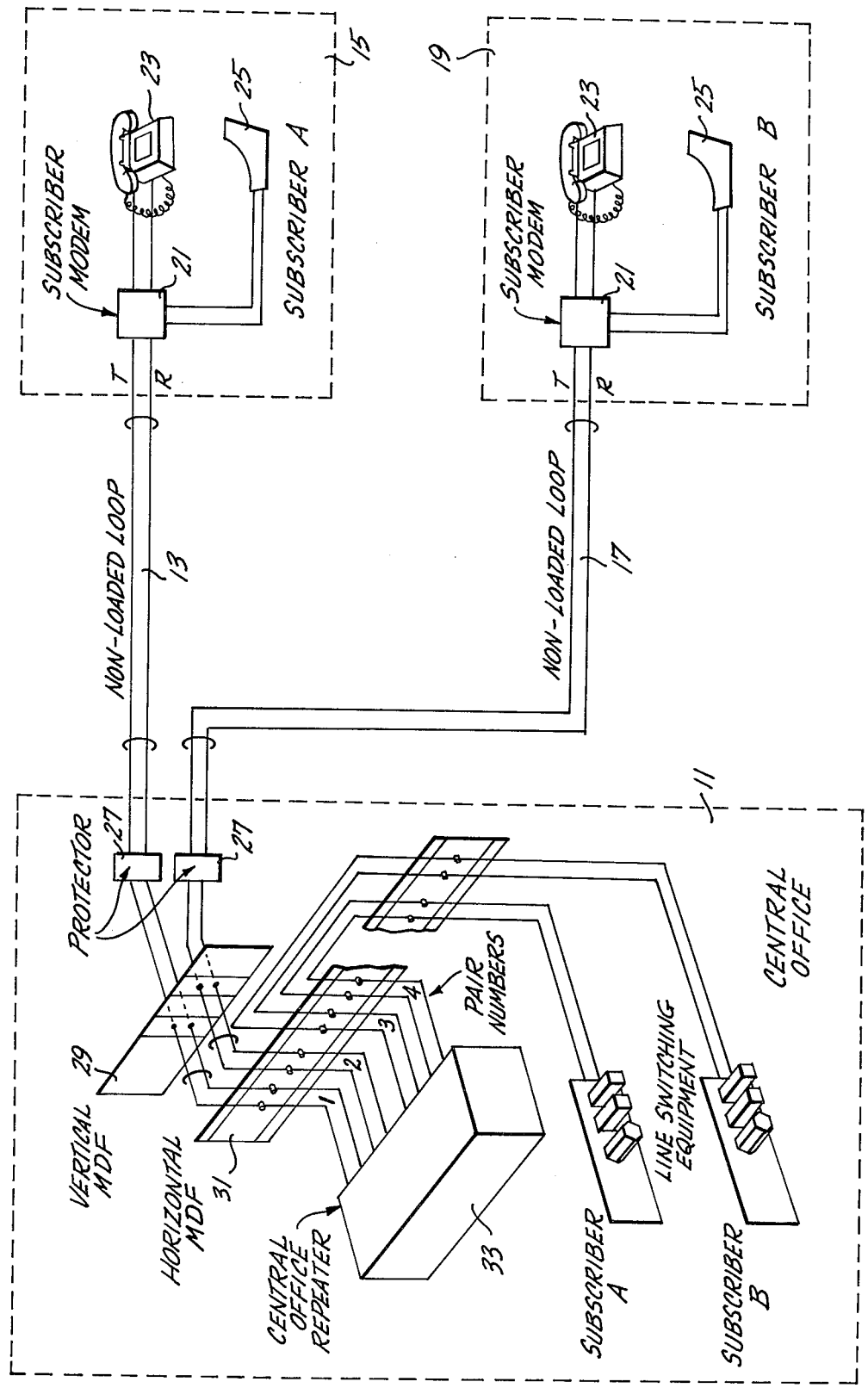
FIG. 1 is a partially block and partially pictorial view illustrating an audio and full duplex digital data carrier system formed in accordance with the invention.

FIG. 1 is a partially block and partially pictorial diagram of an audio and full duplex digital data carrier system formed in accordance with the invention. Included in FIG. 1 is a central office 11 connected by a first pair of telephone wires 13 (commonly called tip and ring wires) to a first subscriber's premises 15, denoted subscriber A; and, by a second pair of telephone wires 17 to a second subscriber's premises 19, denoted subscriber B. The pairs of wires 13 and 17 are nonloaded and, thus, form nonloaded loops, which means that no loading coils (i.e., inductances) are connected to the wires. In most instances this means that the subscribers' premises 15 and 19 are within three miles of the central office 11.

The subscribers' end of each pair of telephone wires 13 and 17 is connected to a modem 21. The modems, in turn, are connected to the subscriber's telephone 23 and data terminal 25. The central office end of each pair of telephone wires 13 and 17 is connected through a protector 27 to appropriate terminals on a vertical main distribution frame 29 and, thence, in a conventional manner to a horizontal main distribution frame 31. For purposes of identification, the terminals of the horizontal main distribution frame 31 connected to the central office end of the pair of telephone wires 13 running to subscriber A are denoted pair 1; and, the terminals of the horizontal main distribution frame connected to the central office end of the pair of telephone wires 17 running to subscriber B are denoted pair 2. The pair 1 and pair 2 terminals are connected to a central office repeater 33, which also forms a portion of the invention.

A preferred embodiment of a central office repeater is illustrated in FIG. 8 and hereinafter described. As will be better understood from that description, the central office repeater 33 includes pair terminals, related to subscribers A and B, that are connected to the line switching equipment of the central office via the horizontal main distribution frame 31. In this regard, the pair of main distribution frame terminals related to subscriber A are denoted pair 3 and the pair of main distribution frame terminals related to subscriber B are denoted pair 4. Pairs 3 and 4 are connected via the horizontal main distribution frame 31 to the appropriate line switching equipment of the central office 11 related to subscribers A and B.

As will be better understood from the following description of FIGS. 2-8, the subscriber modems 21 connect the subscriber's telephone 23 to the related pair of telephone wires through an audio or voice frequency filter. In addition, the modems include transmitters and receivers that transmit one pair of FSK signals and receive another pair. More specifically, when a subscribers data terminal is transmitting data, the modem converts the data from binary form (i.e., 0 and 1 bit form) into FSK form. That is, the modem transmitters produce a signal at one or the other of two frequencies, the particular frequency being dependent upon whether or not the binary data is a zero or a one. The FSK signals produced by the subscriber binary modems are received by the central office repeater 33, via the related pair of telephone wires and vertical and horizontal main distribution frames 29 and 31. The central office repeater converts the signals it receives from transmitted form into reception form. More specifically, the subscriber modems transmit FSK signals at one pair of frequencies (F1 and F2) and receive FSK signals at a different pair of frequencies (F3 and F4). The repeater bidirectionally converts the transmitted signals it receives into modem receivable frequencies. Specifically, F1 signals are converted into F3 signals and F2 signals are converted into F4 signals. The central office repeater also couples the telephone wire pairs to the horizontal main distribution frame 31 so that dial signals can actuate the line switching equipment of the central office in a conventional manner and voice conversations can take place. The repeater includes voice filters that prevent FSK signals from affecting these functions, which occur in a conventional manner.

Since the transmitted and received FSK signals are at different frequencies, full duplex digital data transmission is provided by the invention assuming that the FSK signals are of a form that do not include undesirable harmonics. As will be better understood from the following discussion, the waveforms of the FSK signals and their frequencies are such that harmonic interference is avoided. In addition to full duplex digital data, the system has the capability of simultaneously carrying voice communication signals. Thus, the invention provides for audio and full duplex data transmission on a single pair of nonloaded wires.

Figure 2:
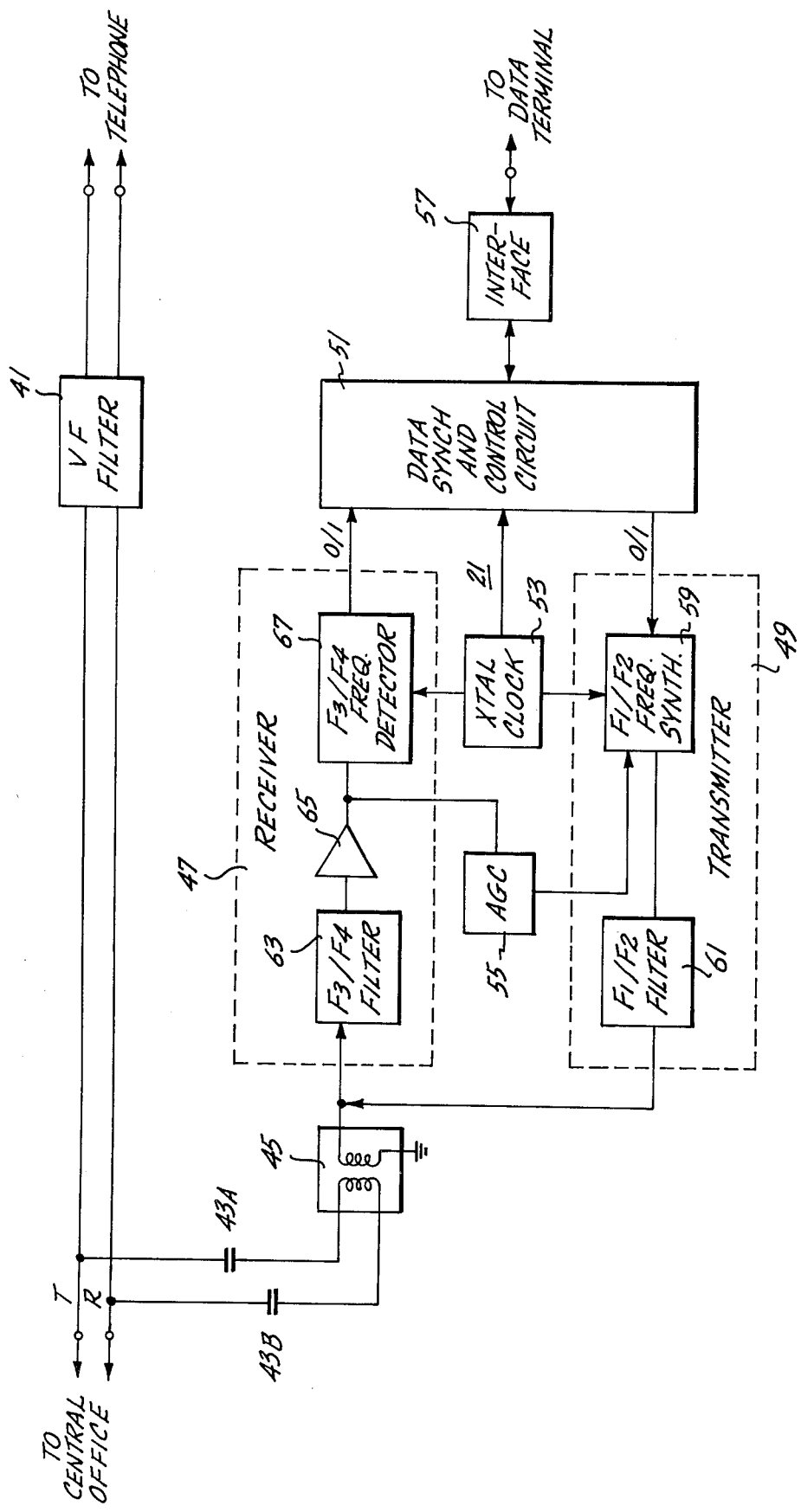
FIG. 2 is a block diagram illustrating a subscriber modem suitable for use in the audio and full duplex digital data carrier system illustrated in FIG. 1.

FIG. 2 is a block diagram of a subscriber modem 21 suitable for use in the system illustrated in FIG. 1 and includes: a voice frequency (VF) filter 41; a pair of coupling capacitors 43A and 43B; a coupling transformer 45; a receiver 47; a transmitter 49; a data sync and control circuit 51; a crystal clock 53; an automatic gain control (AGC) circuit 55; and, an interface 57.

As schematically illustrated in FIG. 2, the subscriber end of the related tip (T) and ring (R) pair of nonloaded telephone wires are connected through the voice frequency filter 41 to the subscriber's telephone. The voice frequency filter 41 is bidirectional, i.e., voice signals can pass to and from the subscriber's telephone. However, the filter prevents FSK signals from being applied to the telephone. In this regard, the FSK signals are chosen to lie above the normal voice frequency band. Specific examples of FSK signal frequencies are set forth below.

The subscriber end of the related tip and ring pair of telephone wires are also connected via the coupling capacitors 43A and 43B to one side of the coupling transformer 45. The other side of the coupling transformer 45 is connected to the input of the receiver 47 and to the output of the transmitter 49. The output of the receiver is connected to an input to the data sync and control circuit 51 and the input of the transmitter 49 is connected to an output of the data sync and control circuit 51. In addition, the data sync and control circuit 51 is connected to the crystal clock 53 so as to receive clock pulses. Also, the automatic gain control circuit 55 has its input connected to the receiver 47 and its output connected to a control input of the transmitter 49. Finally, the data sync and control circuit 51 is connected through the interface 57 to the subscriber's data terminal.

As noted above, the FSK signals transmitted by the transmitter 49 may be denoted F1 and F2. For purposes of discussion, it is assumed that F1 is produced when the data terminal produces a binary zero and F2 is produced when the data terminal produces a binary one. The FSK signals received by the receiver 47, as also noted above, are designated F3 and F4. For purposes of discussion, it is assumed that an F3 signal denotes a binary zero in FSK form and and F4 signal denotes a binary one in FSK form. Further, in addition to being above the voice frequency band, preferably, the frequency of F3 is equal to twice the frequency of F1 and the frequency of F4 is equal to twice the frequency of F2. While various specific frequencies can be utilized, in one actual embodiment of the present invention, F1 had a nominal value of 36 KHz, F2 had a nominal value of 40 KHz, F3 had a nominal value of 72 KHz and F4 had a nominal vlaue of 80 KHz.

As illustrated in FIG. 2, the transmitter 49 includes an F1/F2 frequency synthesizer and an F1/F2 filter. The frequency synthesizer receives the zero/one binary data signals produced by the data terminal, via the interface 57 and the data sync and control circuit 51. In addition, the F1/F2 frequency synthesizer receives clock pulses produced by the crystal clock 53; and, an amplification control signal produced by the automatic gain control (AGC) circuit 55. In accordance therewith, as hereinafter described in detail, the frequency synthesizer produces F1 and F2 signals. The output of the F1/F2 frequency synthesizer 59 is connected through the F1/F2 filter 61 to the coupling transformer 45. The F1/F2 filter is a bandpass filter that passes signals in the F1/F2 frequency range and rejects signals at other frequencies.

The receiver 47 includes an F3/F4 filter 63, an amplifier 65 and an F3/F4 frequency detector 67. The input of the F3/F4 filter is connected to the receiver side of the coupling transformer 45 and only passes FSK signals in the F3/F4 frequency range. The output of the F3/F4 filter 63 is connected through the amplifier 65 to the input of the F3/F4 frequency detector 67. The output of the frequency detector, which determines whether or not the incoming frequency is an F3 signal or an F4 signal, is connected to the data sync and control circuit 51.

In addition to being connected to the input of the F3/F4 frequency detector 67, the output of the amplifier 65 of the receiver 47 is connected to the control input of the automatic gain control circuit 55. The output of the automatic gain control circuit 55, as previously noted, is connected to the F1/F2 frequency synthesizer 59. The AGC circuit 55 inversely controls the magnitude of the signal produced by the F1/F2 frequency synthesizer in accordance with the magnitude of the received signal. More specifically, the magnitude of the transmitted signal, as will be better understood from the following description, is controlled by the AGC circuit such that its logarithm is proportional to the negative logarithm of the magnitude of the received signal. This arrangement compensates for the attenuation differences of different length pairs of tip and ring wires. More specifically, the longer the tip and ring wires connecting the modem of the receiving subscriber to the central office, the weaker will be the received signal. As a consequence of the negative logarithmic AGC control a weak received signal causes a strong transmitted signal. This arrangement assures that the central office will receive modulated data signals from the subscribers at nearer the same level, regardless of any difference in the distance between the central office and the subscriber's premises.

Figure 3:
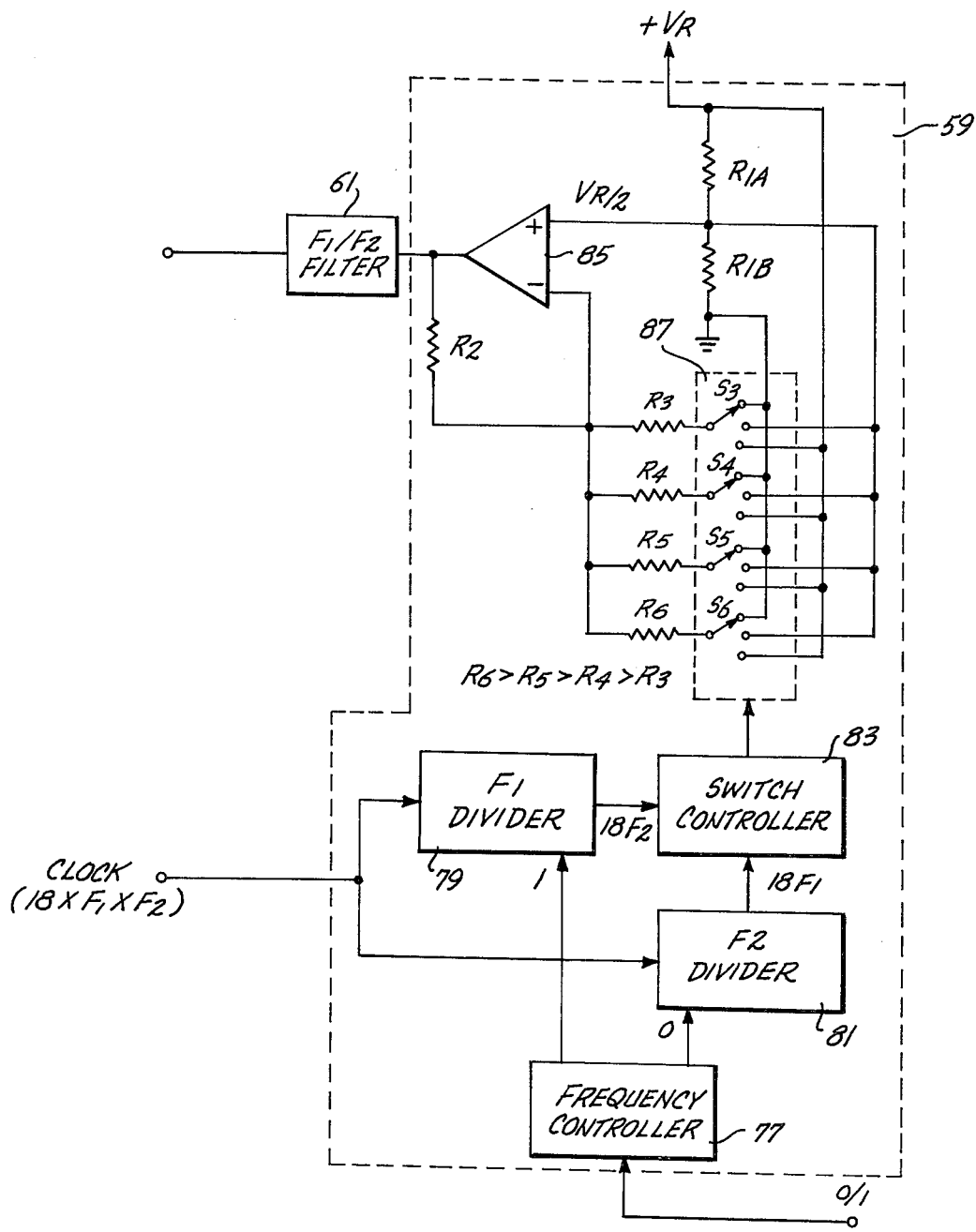
FIG. 3 is a schematic diagram of a transmitter suitable for use in the modem illustrated in FIG. 2.

FIG. 3 is a partially schematic and partially block diagram illustrating in more detail a transmitter 49 formed in accordance with the invention. More specifically, FIG. 3 includes the F1/F2 frequency synthesizer 59 and the F1/F2 filter 61. The F1/F2 frequency synthesizer 59 is illustrated as including: a frequency controller 77; an F1 divider 79; an F2 divider 81; a switch controller 83; an operational amplifier 85; seven resistors designated R1A, R1B, R2, R3, R4, R5 and R6; and, a multiple switch 87. While the multiple switch 87 is illustrated as comprising four separately actuated single pole, triple throw mechanical switches, designated S3, S4, S5 and S6, it is to be understood that this simplification is for descriptive purposes only. That is, rather than being formed by four single pole, triple throw mechanical switches, in an actual embodiment of the invention, S3, S4, S5 and S6 would be formed by plurality of semiconductor switches.

The zero/one (0/1) binary data signals produced by the data sync and control circuit, in accordance with the binary data produced by the data terminal (as received by the interface 57), are applied to the control input of the frequency controller 77. The frequency controller 77 includes two outputs, denoted one (1) and zero (0). When the frequency controller 77 receives a binary one data signal, the one (1) output of the frequency controller carries an enable signal. When the frequency controller receives a binary zero data signal, the zero output of the frequency controller 77 carries an enable signal. Further, when one of these output carries an enable signal the other carries a disable signal. Thus, in essence, the frequency controller 77 forms a decoder that enables one or the other of two outputs, based on the nature of its input. The function of the controller is readily accomplished by applying the 0/1 input directly to one output; and, inverting the 0/1 input and applying the inverted value to the other output.

The output of the crystal clock 53, shown in FIG. 2 as applied to the F1/F2 frequency synthesizer 59, is connected to the clock inputs of both the F1 divider and the F2 divider. The enable input of the F1 divider is connected to the one (1) output of the frequency controller 77 and the enable input of the F2 divider is connected to the zero (0) output of the frequency controller 77. The outputs of the F1 and F2 dividers are connected to control inputs of the switch controller 83. The output of the switch controller 83 is connected to control the multiple switch 87.

A variable reference voltage denoted $+V_R$ is connected through R1A in series with R1B to ground. The resistance value of R1A is equal to the resistance value of R1B. Thus, the voltage at the junction between R1A and R1B is $+V_R/2$. This junction is connected to the noninverting input of the operational amplifier 85.

The magnitude of $+V_R$ is controlled by the output of the AGC circuit 55 through a suitable control circuit (not shown). Alternatively, the AGC circuit 55 could produce $+V_R$ directly. In any event, the value of $+V_R$ is derived from the negative logarithm of the amplitude of the received signal, as previously described.

As noted above, S3, S4, S5 and S6 are illustrated as separately actuated, single pole, triple throw mechanical switches, even though preferably formed of semiconductor switches. In any event, each switch has a "common" terminal and three "remote" terminals. For purposes of description, the remote terminals S3, S4, S5 and S6 are denoted the upper remote terminal, the middle remote terminal and the lower remote terminal. This notation corresponds to how the switches are illustrated in FIG. 3. The upper remote terminal of S3, S4, S5 and S6 are all connected together and to ground. The middle remote terminal of S3, S4, S5 and S6 are all connected together and to the junction between R1A and R1B. The lower remote terminals of S3, S4, S5 and S6 are all connected together and to $+V_R$. The common terminal of S3 is connected through R3 to the inverting input of the operational amplifier 85. The common terminal of S4 is connected through R4 to the inverting terminal of the operational amplifier 85 and the common terminal of S5 is connected through R5 to the inverting terminal of the operational amplifier 85. Finally, the common terminal of S6 is connected through R6 to the inverting terminal of the operational amplifier 85. The output of operational amplifier 85 is connected through R2 to its inverting input. The output of the operational amplifier 85 is also connected to the input of the F1/F2 filter 61.

Figure 4:
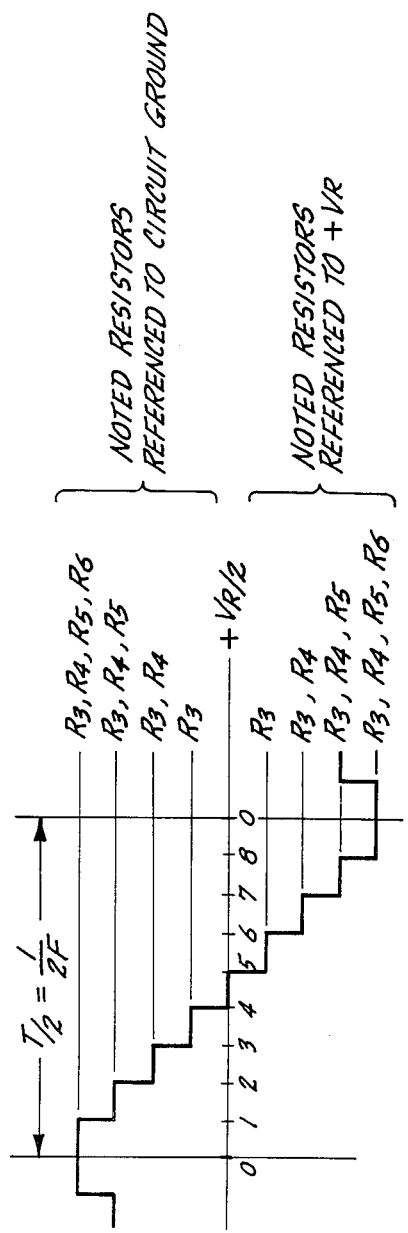
FIG. 4 is a waveform diagram illustrating the stair step form of the signals produced by the frequency synthesizer illustrated in FIG. 3.
Figure 5:
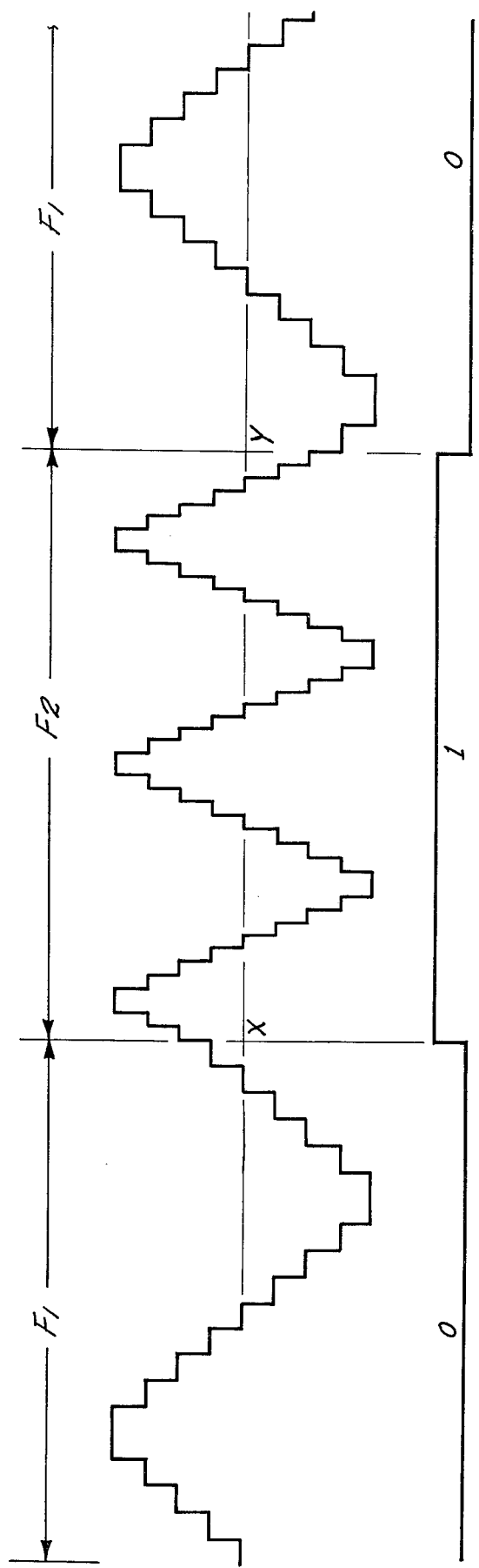
FIG. 5 is a waveform diagram pictorially illustrating how phase coherence is maintained between two signals produced by the frequency synthesizer illustrated in FIG. 3 during a frequency change.

Turning now to a description of the operation of the frequency synthesizer illustrated in FIG. 3; in this regard, attention is directed to FIGS. 4 and 5, as well as FIG. 3. As illustrated in FIG. 3, the frequency of the clock signal received by the frequency synthesizer 59 is equal to $18 \times F1 \times F2$. This signal may be produced directly by the crystal clock 53 or may be formed by counting down a higher frequency clock signal. In any event, the $18 \times F1 \times F2$ clock signal is divided down by either the F1 divider or the F2 divider, depending upon which divider is enabled. More specifically, as previously discussed, the frequency controller 77 has two outputs, one connected to the enable input of the F1 divider and the other connected to the enable input of the F2 divider. One and only one of the two outputs of the frequency controller 77 carries an enable signal. Which output is determined by the nature of the signal received by the frequency controller from the data sync and control circuit 51, as previously described. Thus, one and only one of the F1 and F2 dividers is enabled. If the F1 divider is enabled, it produces a signal at a frequency equal to 18F2, because the F1 divider divides the $18 \times F1 \times F2$ signal by F1. If the $F_2$ divider is enabled, it produces a signal at frequency 18F1, because the F2 divider divides the $18 \times F1 \times F2$ signal by F2. Whichever signal is produced, that signal controls the frequency of switch position changes produced by the switch controller 83. More specifically, the sequence of position changes of S3, S4, S5 and S6 is fixed, as discussed below. However, the frequency of shifting from one switch position to the next switch position is controlled. This frequency control is based on which one of the F1 and F2 dividers is enabled.

FIG. 4 illustrates that there are nine (9) discrete switch position configurations utilized by the preferred embodiment of the invention, which change in a stair step manner. The sequence is such that a decreasing stair step is followed by an increasing stair step to make up a waveform having a generally sinusoidal shape. Thus the nine positions are repeated, first in one direction (i.e., decreasing) then in the other direction (i.e., increasing). Thus, eighteen (18) separate step intervals define a complete cycle. While the preferred embodiment of the invention includes nine discrete switch position configurations to create nine discrete voltage levels, it will be appreciated that other numbers can be chosen, depending upon the type and number of harmonics that are acceptable. Nine was chosen for the preferred embodiment because no harmonics lower than the seventeenth (17th) harmonic occur.

As will be understood from the foregoing description of FIG. 3, and as shown in FIG. 4, R3, R4, R5 and R6 can be referenced to either ground, $+V_R/2$ or $+V_R$. More specifically, when the common terminal of a particular switch (S3, S4, S5 or S6) is connected to its upper remote terminal, its related resistor (R3, R4, R5 or R6) is referenced to circuit ground. When the common terminal of a particular switch is connected to its center remote erminal, its related resistor is referenced to $+V_R/2$. Further, when the common terminal of a particular switch is connected to its lower remote terminal, its related resistor is referenced to $+V_R$. The stair step sinusoidal waveform is created controlling the switches such that the resistors are referenced to the appropriate value at the appropriate point in the eighteen interval sequence. In this regard, starting at the top of the sinusoid, R3 through R6 are all referenced to ground. That is, S3 through S6 are all positioned such that their respective common terminals are connected to their upper remote terminals. As a result, the highest output voltage producible is produced at the output of the operational amplifier 85. The next step in the sequence is to maintain S3, S4 and S5 positioned such that their resistors (R3, R4 and R5, respectively) are referenced to ground and position S6 such that R6 is referenced to $+V_R/2$. As a result, the output voltage of the operational amplifier 85 drops by a predetermined incremental value. The next step in the sequence is to maintain R3 and R4 referenced to ground by not changing the positions of S3 and S4; and, position S5 such that R5 is referenced to $+V_R/2$, while maintaining R6 referenced to $+V_B/2$. As a result, the output voltage of the operational amplifier drops by a further incremental amount. Next, R3 alone is maintained referenced to ground while R4, R5, and R6 are all referenced to $+V_R/2$. As a result, the output voltage drops by a further incremental amount. Next, R3, R4, R5 and R6 are all referenced to $+V_R/2$ whereby a further incremental drop in the output of the operational amplifier 85 occurs. The next step is to maintain R4, R5 and R6 referenced to $+V_R/2$ while referencing R3 to $+V_R$. This result is created by causing S3 to connect its common terminal to its lower remote terminal while maintaining S4, S5 and S6 positioned such that their common terminals are all connected to their middle remote terminals. As a result, the output voltage drops by a further incremental amount. The next step is to cause S3 and S4 to connect their common terminals to $+V_R$ while maintaining S5 and S6 positioned such that their common terminals are connected to their middle remote terminals. Again, the output voltage drops by a further increment. The next step is to cause R3, R4 and R5 to all be referenced to $+V_R$ while maintaining R6 referenced to $+V_R/2$. This results in a further incremental drop in the output voltage. Finally, R3, R4, R5 and R6 are all referenced to $+V_R$, whereby the output voltage of the operational amplifier drops to its minimum value. This declining stair step voltage is followed by an inclining stair step voltage during which the foregoing sequence is reversed. The end result is a declining stair step followed by an inclining stair step, the totality of which has a sinusoidal configuration if the values of R3, R4, R5 and R6 are chosen so that the appropriate ratios exist therebetween. In third regard, the appropriate ratios will exist if R3=29.4K, R4=33.2K, R5=45.3K and R6=84.5K.

In summary, the amplitude of the waveform is controlled by a reference voltage ($+V_R$) derived from the amplitude of the received signal via the AGC circuit. The two divider resistors (RIA and RIB) produce a voltage of one-half the reference voltage, which is applied to the noninverting input of the operational amplifier 85. The output of the amplifier is controlled by R2 and the summing resistors R3 through R6, which are switched by switches S3 through S6 so as to be referenced to one of the three possible voltages consisting of $+V_R$, $+V_R/2$ and circuit ground. The output of the operational amplifier is filtered by the F1/F2 filter, which passes the fundamental frequencies of F1 and F2 and feeds them to the coupling transformer 45.

The length of the step intervals of the stair step waveform are controlled by counting down a clock signal equal to the number of step intervals (18) times the desired frequency (F1 or F2). Producing a clock signal that is equal to the number of step intervals times both F1 and F2, and dividing the signal by the undesired frequency, F1 or F2, results in a clock signal at a frequency equal to the desired frequency times the number of intervals. The switch controller, in accordance with this clock signal causes S3 through S6 to change positions, at 18 times the desired frequency. As a result, the composite stair step waveform has a frequency equal to the desired frequency.

By way of example only, the switch controller could comprise an eighteen state ring counter clocked by the output of the enabled divider; and, a decoder for controlling the position of the switches based on the state of the ring counter.

It is highly desirable, if not mandatory, that the signals produced by the frequency synthesizer have two important properties. First, it is desirable that changing from one frequency to the other occurs without loss of coherence of the phase of the sine wave of the overall signal. FIG. 5 illustrates how the frequency synthesizer of the invention achieves this important result. Specifically, for purposes of illustration only, FIG. 5 illustrates a signal where F2 is equal to twice the frequency of F1. As noted above, in an actual embodiment of the invention, F2 would be close to, but spaced from F1 by a small amount, such as 10 percent of F1. However, so related signals are difficult to illustrate. As a result, FIG. 5 uses a 50 percent frequency difference to illustrate how phase coherence is maintained. More specifically, FIG. 5 illustrates on the right an F1 stair step sinusoidal waveform, representing a binary zero signal, as shown on the bottom line of FIG. 5. At this time, the F2 divider is enabled. At time X, the digital input shifts from zero to one. As a result the F2 divider is disabled and the F1 divider is enabled. Since the switch controller controls the sequence of switch position changes, the switches continue in the same sequence when the divider enablement changes. That is, the divider enablement only changes the step interval changes, not the magnitude of the step interval voltages. As a result, a smooth transition from F1 to F2 occurs at point X. At point Y, the signal shifts back from F2 to F1, as the result of the binary data changing from one to zero. Again, only the step interval changes, whereby a smooth transition occurs from F2 to F1. Hence, the invention provides a frequency synthesizer wherein frequency shifts between F1 and F2, and vice versa, occur without significant changes in phase. As a result, the coherence of the phase of the sinusoidal wave is maintained through the frequency shift. It will be appreciated that maintaining phase coherence reduces the bandwidth occupied by the synthesized signal.

The second important requirement of the waveform of the signal produced by the frequency synthesizer is that it be very low in harmonics at or near the frequency of the signal to be received. That is, F1 and F2 form FSK signals to be transmitted. In order for these signals not to interfere with the FSK signals to be received (i.e., F3 and F4), F1 and F2 must be low in F3 and F4 harmonics. In this regard, as noted above, F3 and F4, preferably, are equal to twice the frequency of F1 and F2, respectively. As a result, it is necessary that the frequency synthesizer produce signals that are substantially free of second harmonics. If the signals are not substantially free of second harmonics, the transmitted signal will interfere with the received signals and cause errors. This avoidance of interferring harmonics is of particular significance because the magnitude of the transmitted signals can be easily 40 db higher than the received signals. The frequency synthesizer of the present invention produces waveforms that avoid this problem. More specifically, it can be shown theoretically, and has been verified experimentally, that if the amplitude of the steps of the stair step sinusoidal waveform are chosen properly, the first nonzero harmonic component of the fundamental frequency F is at the frequency 17F. Because the first significant harmonic is the 17th harmonic of the fundamental frequency, the produced waveform requires very little in the way of filtering to create a pure sinusoid of frequency F1 or F2. Thus, harmonic interference is avoided and an accurate frequency controlled signal digitally derived from a crystal oscillator is produced.

FIG. 6 is a block diagram of a receiver 47 suitable for use in the modem illustrated in FIG. 2 and comprises: the F3/F4 filter 63; the amplifier 65; and, the frequency detector 67. The frequency detector 67 is illustrated as comprising an interval timer 91; a decoder 93; a guarding circuit 95; and, a zero crossing detector 97. As previously discussed with respect to FIG. 2, the coupling transformer 45 is connected through the F3/F4 filter to the input of the amplifier 65. As illustrated in FIG. 6, the output of the amplifier 65 is connected to an input of the zero crossing detector 97 and to the AGC circuit. The output of the zero crossing detector is connected to a reset input of the interval timer 91 and a control (read) input of the decoder 93. Further, the clock signal produced by the crystal clock 53 is connected to the clock input of the interval timer 91. The outputs of appropriate stages of the interval timer 91 are connected to the decoder 93. Selected outputs of the decoder 93 are connected to the guarding circuit 95 and the output of the guarding circuit 95 is connected to the data sync and control circuit 51. In addition, the decoder 93 is connected to output terminals denoted TROUBLE INDICATOR and INTERNAL CONTROL, which are representative of various outputs hereinafter described.

The F3/F4 filter 63 passes F3/F4 signals, which are amplified by the amplifier 65. The zero crossing detector 97 converts the amplified signal into a square wave, which is applied to the reset input of the interval timer 91. The interval timer 91 is adapted to be reset either on each low to high rise of the signal applied to its reset input or each high to low fall. Regardless of whether a rise or a fall is chosen to reset the interval timer, the timer is reset at the same point in each square wave cycle. Thus, the interval timer counts clock pulses for each cycle. Just prior to being reset, the interval timer count is read by the decoder 93.

At the end of each count, the decoder 93 categorizes the time interval counted by the interval timer into one of five categories denoted M, N, O, P and Q in FIG. 7. Interval M extends from zero to some predetermined time T1. If the decoder count falls fall in this interval (M), the frequency of the received signal is higher than F4. The next interval, denoted interval N, lies between T1 and a later time denoted T2. If the decoded count lies in interval N, i.e., between T1 and T2, the frequency of the received signal is F4 (or near enough to F4 to be considered a valid F4 signal); and, a binary 1 is applied to the guarding circuit 95. The next interval, denoted interval O, lies between T2 and a later time denoted T3. If the incoming signal falls in interval O, the frequency of the received signal lies between F3 and F4, but not close enough to either F3 or F4 to be recognized as either a valid F3 or F4 signal. The next interval, denoted interval P, lies between T3 and a later time denoted T4. If the decoded count indicates that the frequency of the received signal lies in interval P, the frequency of the received signal is F3 (or near enough to F3 to be considered a valid F3 signal); and, the decoder applies a binary zero to the guarding circuit 95. Finally, if decoded count indicates that the frequency of the received signal has a period greater than T4, the signal lies in interval Q, which means that the frequency of the received signal is less than the F3 frequency.

In summary, the interval timer applies a clock pulse count to the decoder. The pulse count is related to the period of the received signal. The decoder decodes the pulse count and categorizes the time interval into one of five categories. The decoder classifies counts falling in interval N as the receipt of a binary one and those falling in interval P as the receipt of a binary zero. Preferably, the output of the decoder is a DC signal whose level denotes the nature (0 or 1) of the decoded bit. The decoded ones and zeros are applied to the guarding circuit 95, which insures that the one or zero is not the result of transient noise or an interferring signal by requiring that the one or zero exist for at least two successive intervals. That is, the nature of the received signal must remain constant for at least two sinusoidal waveforms before the signal is acknowledged by the guarding circuit 95 as a valid zero or one; and, forwarded to the data sync and control circuit 51. Thus, if the guarding circuit is outputting a level corresponding to a zero, it will change to a one if, and only if, it receives two successive signals in category N from the decoder 93. Alternatively, if the guarding circuit 95 is outputting a level corresponding to a one, it will change to a zero if, and only if, it receives two successive signals in category P from the decoder 93.

Signals in categories M, O or Q cause signals on the TROUBLE INDICATOR or INTERNAL CONTROL outputs, as appropriate. For example, signals in category O could create a TROUBLE INDICATOR output. A series of such outputs could be used to indicate to the subscriber that the received FSK signal is falling between the two data bit signals. This would, of course, indicate to the subscriber that the circuitry is functioning incorrectly. Alternatively, a succession of signals in category Q could be used to indicate to the modem that it should connect its input to its output for remote test purposes. Obviously, these are only two of many examples of how the TROUBLE INDICATOR and INTERNAL CONTROL signals can be used.

Frequency detectors of the type generally illustrated in FIG. 6 are well known to those skilled in the telephone and other communication arts. In this regard, attention is directed to U.S. Pat. No. 3,917,912 entitled "Multifrequency Dialing Signal Receiver for Push-button Type Telephone Systems" and to United States Patent Application, Ser. No. 816,008, filed July 15, 1977 and entitled "DTMF and Rotary Dial Pulse Digit Receiver" by Frank Twiss, both of which disclose in detail frequency detectors that include time interval counters, decoders and guarding circuits, as part of other systems.

FIG. 8 is a block diagram of a repeater suitable for use in the audio and full duplex digital data carrier system illustrated in FIG. 1 and comprises: two voice frequency (VF) filters 101 and 103; two sets of coupling capacitors 105A and B and 107A and B; two coupling transformers 109 and 111; two F1/F2 filters 113 and 115; two controllable amplifiers 117 and 119; two frequency doublers 121 and 123; two automatic gain control (AGC) circuits 125 and 127; two F3/F4 filters 129 and 131; two fixed amplifiers 133 and 135; and, a loopback switch 137. Pair 1, which is connected to the central office end of the tip and ring wire pair running to subscriber A via the horizontal and vertical main distribution frames, as illustrated in FIG. 1 and previously described, is connected to one side of the first voice frequency filter 101. The other side of the first voice frequency filter is connected to pair 4. Pair 1 is also coupled via the first pair of coupling capacitors 105A and 105B to one side of the first coupling transformer 109. The other side of the coupling transformer 109 is connected between ground and the input of the first F1/F2 filter 113. The output of the first F1/F2 filter 113 is connected through the first controllable amplifier 117 to the input of the first frequency doubler 121. The output of the first frequency doubler 121 is connected to the input of the first automatic gain control circuit 125, whose output is connected to the control input of the first controllable amplifier 117. The output of the first frequency doubler 121 is also connected through the first F3/F4 filter 129 to the input of the first fixed amplifier 133. Similarly, pair 2 (which is connected to subscriber B) is connected to one side of the second voice filter 103 and the other side of the second voice filter 103 is connected to pair 3. Pair 2 is also coupled by the second pair of coupling capacitors 107A and 107B to one side of the second coupling transformer 111. The other side of the second coupling transformer 111 is connected between ground and the input of the second F1/F2 filter 115. The output of the second F1/F2 filter 115 is connected to the input of the second controllable amplifier 119. The output of the second controllable amplifier 119 is connected to the input of the second frequency doubler 123; and, the output of the second frequency doubler 123 is connected to the input of the second automatic gain control circuit 127. The output of the second automatic gain control circuit 127 is connected to the control input of the second controllable amplifier 119. The output of the second frequency doubler 123 is also connected through the second F3/F4 filter 131 to the input of the second fixed amplifier 135.

The loopback switch 137 comprises two single pole, double throw switches 139 and 141 ganged together. Thus, each switch has a common terminal and two remote terminals. The common terminal of the first switch 139 is connected to the output of the first fixed amplifier 133. The common terminal of the second switch 141 is connected to the output of the second fixed amplifier 135. The remote terminals of the switches are connected together on a one-to-one basis such that when the common terminal of one switch is connected to a particular one of its remote terminals, the common terminal of the other switch is connected to the other remote terminal. Further, the common connection between one set of remote terminals is connected to the junction between the second coupling transformer 111 and the input of the second F1/F2 filter 115; and, the common connection between the other set of remote terminals is connected to the junction between the first coupling transformer 109 and the input of the first F1/F2 filter 113.

In operation, the first and second voice frequency filters 101 and 103, of course, prevent the FSK data signals from being applied to the line switching equipment of the central office 11. The pairs of coupling capacitors 105A, B and 107A, B couple the transmitted FSK signals (i.e., F1 and F2) to the coupling transformers, which in turn, couple these signals to the F1/F2 filters. The filtered F1 and F2 signals are amplified by the controllable amplifiers 117 and 119 and, then, the signal frequency is doubled by the frequency doublers 121 and 123. After doubling, which converts F1 signals into F3 signals and F2 signals into F4 signals, the signals are filtered by the F3/F4 filters 129 and 131. Thereafter, the F3 and F4 signals are applied to the opposing loop via the loopback switch 137 and the other channel's coupling transformer and coupling capacitors. The AGC circuits 125 and 127 feedback gain control signals around the frequency doublers to assure proper operation.

By way of a specific example, when digital data is being transmitted by subscriber A, the F1 and F2 FSK signals are coupled by the first pair of coupling capacitors 105A and 105B and the first coupling transformer 109 to the input of the first F1/F2 filter 113. The output of the first F1/F2 filter is amplified by the first controllable amplifier 117. Thereafter, the frequency of the transmitted FSK signals are doubled by the frequency doubler 121. The resultant F3 and F4 FSK signals are filtered by the first F3/F4 filter 129 and amplified by the first fixed amplifier 133. The amplified F3 and F4 FSK signals are then fed by the loopback switch to subscriber B's pair of telephone wires via the second coupling transformer 111 and the second pair of coupling capacitors 107A and 107B. Similarly, F1 and F2 FSK signals transmitted by subscriber B are coupled via the second pair of coupling transformers 107A and 107B and the second coupling transformer 111 to the input of the second F1/F2 filter 115. These signals are filtered by the second F1/F2 filter 115, and amplified by the second controllable amplifier 119. After being amplified, the frequency of the F1 and F2 FSK signals produced by subscriber B are doubled by the second frequency doubler 123 and, thus, converted into F3 and F4 FSK signals. The F3 and F4 FSK signals are filtered by the second F3/F4 filter 31 and, then, amplified by the second fixed amplifier 135. After amplification, these signals are applied to the pair of telephone wires running to subscriber A via the loop back switch, the first coupling transformer 109 and the first pair of coupling capacitors 105A and 105B.

As will be readily appreciated by those skilled in the electronics art, the first and second fixed amplifiers 133 and 135 must have high output impedances. Alternatively, if low output impedance amplifiers (such as operational amplifiers) are chosen, a suitable high impedance coupling circuit (such as a tank circuit) must be connected in circuit between the output of the amplifiers and the related junction between the coupling transformers and the F1/F2 filters.

Preferably, the frequency doublers merely full wave rectify the signals they receive to double the frequency of these signals. In addition, it should be noted the loop back switch can be positioned so as to "loop back" incoming signals from both subscribers to their respective origins. This can be done for test purposes or, if desired, to prevent transmitted FSK signals from being received by the other subscriber's modem.

It will be appreciated from the foregoing description that an audio and full duplex digital data carrier system is provided by the invention. Even though only a single pair of nonloaded wires are required, full duplex digital data transmission, plus simultaneous audio communication can take place. That is, full duplex digital data transmission between a pair of subscribers, plus regular audio communication can take place simultaneously all on the same single pair of wires now connecting each subscriber to the same central office.

While a preferred embodiment of the invention has been illustrated and described, it will be appreciated that various changes can be made therein without departing from the spirit and scope of the invention. For example, while, preferably, the frequency of F3 and F4 are twice the frequency of F1 and F2, respectively, obviously, other frequency relationships can be utilized if desired. In fact, the F3 and F4 signal frequencies do not even have to be integral multiples of the F1 and F2 signal frequencies. However, if the illustrated relationship is maintained, the overall system can be made as uncomplicated as disclosed. Further, the higher frequencies (F3 and F4) could be the transmission frequencies, rather than the reception frequencies, if desired. Still further, the system can be used for full duplex digital data transmission without a simultaneous audio capability, if desired. Hence, the invention can be practiced otherwise than as specifically described herein.

The embodiments of the invention in which an exclusive property or privilege is claimed are defined as follows:

1. A data carrier system for the simultaneous bidirectional transmission of FSK form digital data between two locations on the same wires, said data carrier system comprising:
   (A) a first subsystem for transmitting and receiving digital data in the form of pairs of FSK signals, the frequencies of the pair of first subsystem transmitted FSK signals being different than the frequencies of the pair of FSK signals receivable by said first subsystem, said first subsystem including:
      (1) a data terminal for producing digital data in binary form and for receiving digital data in binary form; and,
      (2) modem means connected between said data terminal and one end of a first pair of nonloaded transmission wires for: (i) converting the binary form digital data produced by said data terminal into FSK form digital data at the frequencies of said pair of first subsystem transmitted FSK signals in a manner that maintains phase coherency during shifts between said pair of first subsystem transmitted FSK signals and in a manner such that the waveforms of the pair of first subsystem transmitted FSK signals are substantially free of harmonics at the frequencies of the pair of FSK signals receivable by said first subsystem; and, (ii) converting FSK form digital data at the frequencies of the pair of FSK signals receivable by said first subsystem into binary form digital data;

(B) a second subsystem for transmitting and receiving digital data in the form of pairs of FSK signals, the frequencies of the pair of second subsystem transmitted FSK signals being different than the frequencies of the pair of FSK signals receivable by said second subsystem, said second subsystem including:

(1) a data terminal for producing digital data in binary form and for receiving digital data in binary form: and, (2) modem means connected between said data terminal and one end of a second pair of nonloaded transmission wires for: (i) converting the binary form digital data produced by said data terminal into FSK form digital data at the frequencies of said pair of second subsystem transmitted FSK signals in a manner that maintains phase coherency during shifts between said pair of second subsystem transmitted FSK signals and in a manner such that the waveforms of the pair of second subsystems transmitted FSK signals are substantially free of harmonics at the frequencies of the pair of FSK signals receivable by said second subsystem; and, (ii) converting FSK form digital data at the frequencies of the pair of FSK signals receivable by said second subsystem into binary form digital data;

(C) a repeater for simultaneously: (i) receiving said first subsystem transmitted FSK signals and converting said first subsystem transmitted FSK signals into FSK signals receivable by said second subsystem; and (ii) receiving said second subsystem transmitted FSK signals and converting said second subsystem transmitted FSK signals into FSK signals receivable by said first subsystem;

(D) a first pair of nonloaded transmission wires connecting said first subsystem to said repeater for simultaneously carrying said first subsystem transmitted FSK signals from said first subsystem to said repeater and said FSK signals receivable by said first subsystem from said repeater to said first subsystem; and, (E) a second pair of nonloaded transmission wires connecting said second subsystem to said repeater for simultaneously carrying said second subsystem transmitted FSK signals from said second subsystem to said repeater and said FSK signals receivable by said second subsystem from said repeater to said second subsystem.

2. A data carrier system as claimed in claim 1 wherein: (a) the frequencies of the pair of first subsystem transmitted FSK signals are the same as the frequencies of the pair of second subsystem transmitted FSK signals; and, (b) the frequencies of the pair of FSK signals receivable by said first subsystem are the same as the frequencies of the pair of FSK signals receivable by said second subsystem.

3. A data carrier system as claimed in claim 2 wherein each of said modem means includes: (a) a transmitter, said transmitter including a frequency synthesizer for producing said pair of first and second subsystem transmitted FSK signals in accordance with the binary form digital data produced by said data terminal; and, (b) a receiver, said receiver including a frequency detector for detecting said pair of first and second subsystem receivable FSK signals, producing binary form digital data in accordance therewith and applying said binary form digital data to said data terminal.

4. A data carrier system as claimed in claim 3 including an automatic gain control circuit connected between the receivers and transmitters of said modems such that the logarithm of the amplitude of the pair of first and second subsystem transmitted FSK signals produced by said frequency synthesizers is controlled by the negative logarithm of the amplitude of the pair of first and second subsystem receivable FSK signals received by said first and second subsystems.

5. A data carrier system as claimed in claim 4 wherein said pair of first and second subsystem transmitted FSK signals produced by said frequency synthesizers have a stair step approximation of a sinusoidal waveform.

6. A data carrier system as claimed in claim 5 wherein a single cycle of the stair step approximation of the sinusoidal waveform signals produced by said frequency synthesizers has 18 equal step intervals.

7. A data carrier system as claimed in claim 6 wherein said frequency synthesizers include:
a voltage source;
an operational amplifier;
a voltage divider connected between said voltage source and ground, said voltage divider including a tap connected to one input of said operational amplifier;
a feedback resistor connected between the output of said operational amplifier and the other input of said operational amplifier;
a resistance network comprising a plurality of resistors, one end of each of said plurality of resistors connected to said other input of said operational amplifier;
switching means connected between the other ends of said plurality of resistors and ground, the tap of said voltage divider and said voltage source; and,
control means for controlling said switching means such that the other ends of said plurality of resistors are selectively connected to ground, the tap of said voltage divider and said voltage source.

8. A data carrier system as claimed in claim 7 wherein the magnitude of the voltage produced by said voltage source is controlled by said automatic gain control circuit.

9. A data carrier system as claimed in claim 8 wherein said control means comprises:
a first divider for dividing a clock signal by a number equal to the frequency of one of said pair of first and second subsystem transmitted FSK signals;
a second divider for dividing a clock signal by a number equal to the frequency of the other of said pair of first and second subsystem transmitted FSK signals;
a clock source for producing clock pulses at a frequency equal to eighteen times the product of the frequencies of said pair of first and second subsystem transmitted FSK signals, said clock source being connected to the clock inputs of said first and second dividers;
a frequency controller connected to receive the binary digital data signals produced by said data terminal and, in accordance therewith, enable one or the other of said first and second dividers; and,
a switch controller connected to the outputs of said first and second dividers so as to be controlled by whichever one of said first and second dividers is enabled, said switch controller connected to said switching means to control said switching means.

10. A data carrier system as claimed in claim 9 wherein said repeater comprises:
first and second bidirectional coupling circuits connected to said first and second pairs of nonloaded transmission wires, respectively;
first and second filters connected to said first and second coupling circuits, respectively, said first and second filters filtering signals on said pairs of nonloaded wires and passing those falling within a predetermined range of the frequencies of said pair of first and second subsystem transmitted FSK signals;
first and second frequency converters connected to the outputs of said first and second filters, respectively, for converting signals at the frequencies of said pair of first and second subsystem transmitted FSK signals into signals at the frequencies of said pair of FSK signals receivable by said first and second subsystems;
third and fourth filters connected to the output of said first and second frequency converters, respectively, for filtering the output of said first and second frequency converters and passing only those signals falling within a predetermined range of the frequencies of said pair of FSK signals receivable by said first and second subsystems; and,
a loopback switch connected to the outputs of said third and fourth filters so as to apply the output of said third filter to said second coupling circuit and the output of said fourth filter to said first coupling circuit.

11. A data carrier system as claimed in claim 2 wherein the frequencies of each of the pair of FSK signals receivable by said first and second subsystems is an integral multiple of one of the frequencies of the pair of first and second subsystem transmitted FSK signals.

12. A data carrier system as claimed in claim 11 wherein the integral multiple is two.

13. A subscriber data carrier system for the simultaneous bidirectional digital data communication between a pair of subscribers and voice communication between the subscribers or the subscribers and others all on a single pair of nonloaded wires connecting the subscribers' premises to the central office of a telephone system, said subscriber data carrier system comprising:
(A) first and second subscriber subsystems, one of said subscriber subsystems being located on the premises of one of said subscribers and the other of said subscriber subsystems being located on the premises of the other of said subscribers, each of said subscriber subsystems comprising:
(1) a data terminal for producing and receiving digital data in binary form; and,
(2) modem means connected between said data terminal and the subscribers' end of a pair of nonloaded wires connecting said subscriber's premises to said central office, each of said modem means including:
(a) a transmitter, said transmitter including a frequency synthesizer for converting digital data produced by said data terminal from binary signal form into FSK signal form such that a binary zero (0) causes said FSK signal to have a first frequency, F1, and a binary one (1) causes said FSK signal to have a second frequency, F2, F1 and F2 lying above the voice frequency band, said frequency synthesizer producing said F1 and F2 FSK signals in a manner that maintains phase coherency during shifts between said F1 and F2 FSK signals and in a manner such that the waveforms of said F1 and F2 FSK signals are substantially free of harmonics at third and fourth frequencies, F3 and F4, F3 and F4 also lying above the voice frequency band; and,
(b) a receiver, said receiver including a frequency detector for detecting an FSK signal at said third frequency, F3, and an FSK signal at said fourth frequency, F4, and converting digital data from FSK signal form into binary signal form such that an FSK signal at said third frequency, F3, causes a binary zero (0) and an FSK signal at said fourth frequency, F4, causes a binary one (1) and applying said binary digital data to said data terminal; and,
(B) a repeater connected to the central office end of the pairs of nonloaded wires connecting said subscribers to said central office, said repeater including conversion means for simultaneously converting F1 and F2 FSK signals produced by either of said subscribers into F3 and F4 FSK signals and fowarding said F3 and F4 FSK signals to the other subscriber.

14. A subscriber data carrier system as claimed in claim 13 wherein each of said subscriber subsystems also include a conventional telephone set connected to the subscribers end of the pair of wires connecting said subscriber's premises to said central office.

15. A subscriber data carrier system as claimed in claim 13 including an automatic gain control circuit connected between said receiver and said transmitter of said modems such that the logarithm of the amplitude of the F1 and F2 FSK signals produced by said frequency synthesizers of said transmitters is controlled by the negative logarithm of the amplitude of the F3 and F4 FSK signals received by said receivers.

16. A subscriber data carrier system as claimed in claim 15 wherein said frequency synthesizer produces signals at said F1 and F2 frequencies having a stair step approximation of a sinusoidal waveform.

17. A subscriber data carrier system as claimed in claim 16 wherein a single cycle of the stair step approximation of the sinusoidal waveform signals produced by said frequency synthesizer includes 18 equal step intervals.

18. A subscriber data carrier system as claimed in claim 17 wherein said frequency synthesizer includes:
a voltage source;
an operational amplifier;
a voltage divider connected between said voltage source and ground, said voltage divider including a tap connected to one input of said operational amplifier;
a feedback resistor connected between the output of said operational amplifier and the other input of said operational amplifier;
a resistance network comprising a plurality of resistors, one end of each of said plurality of resistors connected to said other input of said operational amplifier;
switching means connected between the other ends of said plurality of resistors and ground, the tap of said voltage divider and said voltage source; and, control means for controlling said switching means such that the other end of said plurality of resistors are selectively connected to ground, the tap of said voltage divider and said voltage source.

19. A subscriber data carrier subsystem as claimed in claim 18 wherein the magnitude of the voltage produced by said voltage source is controlled by said automatic gain control circuit.

20. A subscriber data carrier system as claimed in claim 19 wherein said control means comprises:
   a first divider for dividing a clock signal by F1;
   a second divider for dividing a clock signal by F2;
   a clock source for producing clock pulses at a frequency equal to 18×F1×F2, said clock source being connected to the clock inputs of said first and second dividers;
   a frequency controller connected to receive the binary form digital data signals produced by said subscriber data terminal and, in accordance therewith, enable one or the other of said first and second dividers; and,
   a switch controller connected to the outputs of said first and second dividers so as to be controlled by whichever one of said first and second dividers is enabled, said switch controller connected to said switching means to control the operation of said switching means.

21. A subscriber data carrier system as claimed in claim 20 wherein said repeater comprises:
   first and second bidirectional coupling means connected to the central office end of the pairs of wires connecting said subscriber's premises to said central office;
   first and second F1/F2 filters connected to said first and second coupling means, respectively, for passing signals having a frequency at or near F1 and F2 and rejecting signals at other frequencies, including said F3 and F4 frequencies;
   first and second frequency doublers connected to the outputs of said first and second F1/F2 filters, respectively;
   first and second F3/F4 filters connected to the output of said first and second frequency doublers, respectively, for passing signals having a frequency at or near F3 and F4 and rejecting signals at other frequencies, including said F1 and F2 frequencies; and,
   a loopback switch connected to the outputs of said first and second F3/F4 filters so as to apply the output of said first F3/F4 filter to said second coupling circuit and the output of said second F3/F4 filter to said first coupling circuit.

22. A subscriber data carrier system as claimed in claim 13 wherein said frequency synthesizer produces signals at said F1 and F2 frequencies having a stair step approximation of a sinusoidal waveform.

23. A subscriber data carrier system as claimed in claim 22 wherein a single cycle of the stair step approximation of the sinusoidal waveform signals produced by said frequency synthesizer includes 18 equal step intervals.

24. A subscriber data carrier system as claimed in claim 23 wherein said frequency synthesizer includes:
   a voltage source;
   an operational amplifier;
   a voltage divider connected between said voltage source and ground, said voltage divider including a tap connected to one input of said operational amplifier;
   a feedback resistor connected between the output of said operational amplifier and the other input of said operational amplifier;
   a resistance network comprising a plurality of resistors, one end of each of said plurality of resistors connected to said other input of said operational amplifier;
   switching means connected between the other ends of said plurality of resistors and ground, the tap of said voltage divider and said voltage source; and,
   control means for controlling said switching means such that the other end of said plurality of resistors are selectively connected to ground, the tap of said voltage divider and said voltage source.

25. A subscriber data carrier system as claimed in claim 24 wherein said control means comprises:
   a first divider for dividing a clock signal by F1;
   a second divider for dividing a clock signal by F2;
   a clock source for producing clock pulses at a frequency equal to 18×F1×F2, said clock source being connected to the clock inputs of said first and second dividers;
   a frequency controller connected to receive the binary form digital data signals produced by said subscriber data terminal and, in accordance therewith, enable one or the other of said first and second dividers; and,
   a switch controller connected to the outputs of said first and second dividers so as to be controlled by whichever one of said first and second dividers is enabled, said switch controller connected to said switching means to control the operation of said switching means.

26. A subscriber data carrier system as claimed in claim 13 wherein said repeater comprises:
   first and second bidirectional coupling means connected to the central office end of the pairs of wires connecting said subscriber's premises to said central office;
   first and second F1/F2 filters connected to said first and second coupling means, respectively, for passing signals having a frequency at or near F1 and F2 and rejecting signals at other frequencies, including said F3 and F4 frequencies;
   first and second frequency doublers connected to the outputs of said first and second F1/F2 filters, respectively;
   first and second F3/F4 filters connected to the output of said first and second frequency doublers, respectively, for passing signals having a frequency at or near F3 and F4 and rejecting signals at other frequencies, including said F1 and F2 frequencies; and,
   a loopback switch connected to the outputs of said first and second F3/F4 filters so as to apply the output of said first F3/F4 filter to said second coupling circuit and the output of said second F3/F4 filter to said first coupling circuit.

27. A subscriber data carrier system as claimed in claim 13 wherein the frequencies of F3 and F4 are integral multiples of the frequencies of F1 and F2, respectively.

28. A subscriber data carrier system as claimed in claim 27 wherein the frequencies of F3 and F4 are twice the frequencies of F1 and F2, respectively.

29. A frequency synthesizer comprising:

a voltage source;

an operational amplifier;

a voltage divider connected between said voltage source and ground, said voltage divider including a tap connected to one input of said operational amplifier;

a feedback resistor connected between the output of said operational amplifier and the other input of said operational amplifier;

a resistance network comprising a plurality of resistors, one end of each of said plurality of resistors connected to said other input of said operational amplifier;

switching means connected between the other ends of said plurality of resistors and ground, the tap of said voltage divider and said voltage source; and, control means for controlling said switching means such that the other end of said plurality of resistors are selectively connected to ground, the tap of said voltage divider and said voltage source.

30. A frequency synthesizer as claimed in claim 29 wherein said frequency synthesizer produces a signal having a stair step approximation of a sinusoidal waveform.

31. A frequency synthesizer as claimed in claim 30 wherein a single cycle of the stair step approximation of a sinusoidal waveform signal produced by said frequency synthesizer includes 18 equal step intervals.

32. A frequency synthesizer as claimed in claim 29 wherein said frequency synthesizer produces signals at two frequencies, F1 and F2, said signals having a stair step approximation of a sinusoidal waveform.

33. A frequency synthesizer as claimed in claim 32 wherein a single cycle of the stair step approximation of the sinusoidal waveform signals produced by said frequency synthesizer includes 18 equal step intervals.

34. A frequency synthesizer as claimed in claim 33 wherein said control means comprises:

a first divider for dividing a clock signal by F1;

a second divider for dividing a clock signal by F2;

a clock source for producing clock pulses at a frequency equal to $18 \times F1 \times F2$, said clock source being connected to the clock inputs of said first and second dividers;

a frequency controller connected to receive binary form digital data signals and, in accordance therewith, enable one or the other of said first and second dividers; and, a switch controller connected to the outputs of said first and second dividers so as to be controlled by whichever one of said first and second dividers is enabled, said switch controller connected to said switching means to control the operation of said switching means.

35. A modem suitable for simultaneously converting digital data from binary signal form into FSK signal form and from FSK signal form into binary signal form, said modem comprising:

a transmitter, said transmitter including a frequency synthesizer for converting digital data from binary signal form into FSK signal form such that a binary zero (0) causes said FSK signal to have a first frequency, F1, and a binary one (1) causes said FSK signal to have a second frequency, F2, said frequency synthesizer producing said F1 and F2 signals in a manner that maintains phase coherency during shifts between said F1 and F2 signals and in a manner such that the waveforms of said F1 and F2 FSK signals are substantially free of harmonics at third and fourth frequencies, F3 and F4; and, a receiver, said receiver including a frequency detector for detecting an FSK signal at said third and fourth frequencies, F3 and F4, and converting digital data from FSK signal form into binary signal form such that an FSK signal at said third frequency, F3, causes a binary zero (0) and an FSK signal at said fourth frequency, F4, causes a binary one (1).

36. A modem as claimed in claim 35 wherein the frequencies of F3 and F4 are integral multiples of the frequencies of F1 and F2, respectively.

37. A modem as claimed in claim 36 wherein the frequencies of F3 and F4 are twice the frequencies of F1 and F2, respectively.

38. A modem as claimed in claim 37 wherein said frequency synthesizer produces signals at said F1 and F2 frequencies having a stair step approximation of a sinusoidal waveform.

39. A modem as claimed in claim 38 wherein a single cycle of the stair step approximation of the sinusoidal waveform signals produced by said frequency synthesizer includes 18 equal step intervals.

40. A modem as claimed in claim 39 wherein said frequency synthesizer includes:

a voltage source;

an operational amplifier;

a voltage divider connected between said voltage source and ground, said voltage divider including a tap connected to one input of said operational amplifier;

a feedback resistor connected between the output of said operational amplifier and the other input of said operational amplifier;

a resistance network comprising a plurality of resistors, one end of each of said plurality of resistors connected to said other input of said operational amplifier;

switching means connected between the other ends of said plurality of resistors and ground, the tap of said voltage divider and said voltage source; and, control means for controlling said switching means such that the other end of said plurality of resistors are selectively connected to ground, the tap of said voltage divider and said voltage source.

41. A modem as claimed in claim 40 wherein said control means comprises:

a first divider for dividing a clock signal by F1;

a second divider for dividing a clock signal by F2;

a clock source for producing clock pulses at a frequency equal to $18 \times F1 \times F2$, said clock source being connected to the clock inputs of said first and second dividers;

a frequency controller connected to receive binary form digital data signals and, in accordance therewith, enable one or the other of said first and second dividers; and, a switch controller connected to the outputs of said first and second dividers so as to be controlled by whichever one of said first and second dividers is enabled, said switch controller connected to said switching means to control the operation of said switching means.

42. A modem as claimed in claim 35 including an automatic gain control circuit connected between said receiver and said transmitter of said modem such that the logarithm of the amplitude of the F1 and F2 FSK signals produced by said frequency synthesizer of said transmitter is controlled by the negative logarithm of the amplitude of the F3 and F4 FSK signals received by said receiver.

43. A modem as claimed in claim 35 wherein said frequency synthesizer produces signals at said F1 and F2 frequencies having a stair step approximation of a sinusoidal waveform.

44. A modem as claimed in claim 43 wherein a single cycle of the stair step approximation of the sinusoidal waveform signals produced by said frequency synthesizer includes 18 equal step intervals.

45. A modem as claimed in claim 44 wherein said frequency synthesizer includes:
  a voltage source;
  an operational amplifier;
  a voltage divider connected between said voltage source and ground, said voltage divider including a tap connected to one input of said operational amplifier;
  a feedback resistor connected between the output of said operational amplifier and the other input of said operational amplifier;
  a resistance network comprising a plurality of resistors, one end of each of said plurality of resistors connected to said other input of said operational amplifier;
  switching means connected between the other ends of said plurality of resistors and ground, the tap of said voltage divider and said voltage source; and,
  control means for controlling said switching means such that the other end of said plurality of resistors are selectively connected to ground, the tap of said voltage divider and said voltage source.

46. A modem as claimed in claim 45 including an automatic gain control circuit connected between said receiver and said transmitter of said modem such that the logarithm of the amplitude of the F1 and F2 FSK signals produced by said frequency synthesizer of said transmitter is controlled by the negative logarithm of the amplitude of the F3 and F4 FSK signals received by said receiver.

47. A modem as claimed in claim 46 wherein the magnitude of the voltage produced by said voltage source is controlled by said automatic gain control circuit.

48. A modem as claimed in claim 47 wherein said control means comprises:
  a first divider for dividing a clock signal by F1;
  a second divider for dividing a clock signal by F2;
  a clock source for producing clock pulses at a frequency equal to $18 \times F1 \times F2$, said clock source being connected to the clock inputs of said first and second dividers;
  a frequency controller connected to receive binary form digital data signals and, in accordance therewith, enable one or the other of said first and second dividers; and,
  a switch controller connected to the outputs of said first and second dividers so as to be controlled by whichever one of said first and second dividers is enabled, said switch controller connected to said switching means to control the operation of said switching means.

* * * * *